US012784277B2

(12) United States Patent
Tanaka et al.

(10) Patent No.: US 12,784,277 B2
(45) Date of Patent: Nov. 3, 2026

(54) IMAGE PROCESSING SYSTEM, NON-TRANSITORY COMPUTER READABLE MEDIUM, AND METHOD FOR DETERMINING NON-BLANK SHEET

(71) Applicant: FUJIFILM Business Innovation Corp., Tokyo (JP)

(72) Inventors: Yushiro Tanaka, Kanagawa (JP); Masahiko Mizumura, Kanagawa (JP); Seiji Shiraki, Kanagawa (JP); Nagamasa Misu, Kanagawa (JP); Saki Shidara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/454,794

(22) Filed: Aug. 24, 2023

(65) Prior Publication Data

US 2024/0320862 A1 Sep. 26, 2024

(30) Foreign Application Priority Data

Mar. 24, 2023 (JP) ................................ 2023-049041

(51) Int. Cl.
*G06T 7/90* (2017.01)
*H04N 1/00* (2006.01)

(52) U.S. Cl.
CPC .......... *G06T 7/90* (2017.01); *H04N 1/00005* (2013.01); *G06T 2207/10008* (2013.01); *H04N 2201/0096* (2013.01)

(58) Field of Classification Search
CPC ........... G06T 7/90; G06T 2207/10008; H04N 1/00005; H04N 2201/0096
See application file for complete search history.

(56) References Cited

U.S. PATENT DOCUMENTS

| | | | | |
|---|---|---|---|---|
| 8,260,043 B2 | 9/2012 | Kubota | | |
| 9,571,693 B2 * | 2/2017 | Osada | H04N 1/00015 | |
| 2009/0041370 A1 * | 2/2009 | Wu | H04N 1/58 | 382/260 |
| 2009/0116738 A1 * | 5/2009 | Kubota | H04N 1/40062 | 358/401 |

FOREIGN PATENT DOCUMENTS

| | | |
|---|---|---|
| JP | 2009094903 | 4/2009 |

* cited by examiner

*Primary Examiner* — Christopher Wait
(74) *Attorney, Agent, or Firm* — JCIPRNET

(57) ABSTRACT

An image processing system includes an image reader that reads a document image and that generates image information regarding a CIELAB color space, and a processor configured to: obtain L*, a*, and b* histograms for the image information; determine whether there is a contrast in the image information using the L* histogram; determine whether there is a hue difference in the image information using the a* and b* histograms; and determine, if there is a contrast and/or there is a hue difference, that the document image indicates a non-blank sheet.

11 Claims, 16 Drawing Sheets

IMAGE PROCESSING SYSTEM, NON-TRANSITORY COMPUTER READABLE MEDIUM, AND METHOD FOR DETERMINING NON-BLANK SHEET

CROSS-REFERENCE TO RELATED APPLICATIONS

This application is based on and claims priority under 35 USC 119 from Japanese Patent Application No. 2023-049041 filed Mar. 24, 2023.

BACKGROUND

(i) Technical Field

The present disclosure relates to an image processing system, a non-transitory computer readable medium, and a method for processing an image.

(ii) Related Art

Japanese Unexamined Patent Application Publication No. 2009-094903 discloses an image processing apparatus that determines, on the basis of image data including plural pixels, whether the image data is a plain image. The image processing apparatus includes a determination unit that determines whether the image data indicates a plain image by comparing a feature value calculated from the image data with a threshold and a setting unit that receives a reading method employed when image data is read from a document and/or an output method employed when image data is output through printing and that sets the threshold used for the determination in accordance with the input method.

SUMMARY

When a processor determines whether a document image indicates a blank sheet by obtaining, from image information regarding a red, green, and blue (RGB) color space, histograms of maximum values and histograms of maximum differences of RGB, the processor undesirably determines a non-blank sheet as a blank sheet if all the maximum values and all the maximum differences of RGB are the same, even if a color of letters or a pattern is different from a background color of a document. A "blank sheet" refers to a plain document where no letters or patterns are written.

Aspects of non-limiting embodiments of the present disclosure relate to improvement in accuracy of a determination whether a document image indicates a non-blank sheet, compared to when the determination is made by obtaining histograms of maximum values and histograms of maximum differences of RGB from image information regarding an RGB color space.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image processing system including an image reader that reads a document image and that generates image information regarding a CIELAB color space, and a processor configured to: obtain L*, a*, and b* histograms for the image information; determine whether there is a contrast in the image information using the L* histogram; determine whether there is a hue difference in the image information using the a* and b* histograms; and determine, if there is a contrast and/or there is a hue difference, that the document image indicates a non-blank sheet.

BRIEF DESCRIPTION OF THE DRAWINGS

An exemplary embodiment of the present disclosure will be described in detail based on the following figures, wherein.

DETAILED DESCRIPTION

Figure 1:
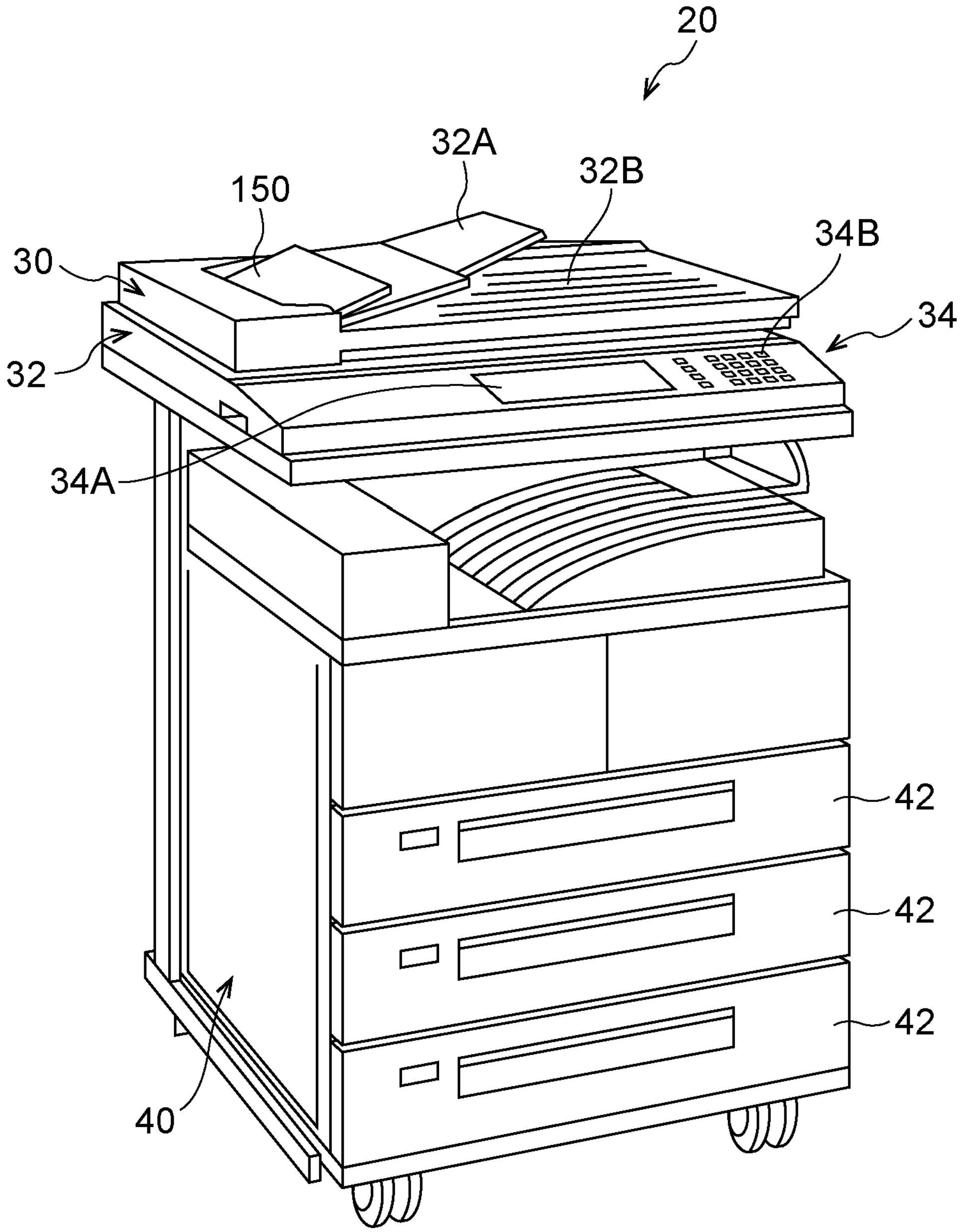
FIG. 1 is a perspective view illustrating the appearance of an image forming apparatus, which is an example of an image forming system according to an exemplary embodiment.

An exemplary embodiment of the present disclosure will be described in detail hereinafter with reference to the drawings. In the present exemplary embodiment, an image forming apparatus will be described as an example of an image processing system. FIG. 1 is a perspective view illustrating the appearance of an image forming apparatus 20 according to the present exemplary embodiment. The image forming apparatus 20 according to the present exemplary embodiment has a printing function for receiving various pieces of data through a communication link such as a network and performing a process for forming an image on the basis of the received pieces of data. The image forming apparatus 20 according to the present exemplary embodiment also has plural functions such as a reading function for reading a document and obtaining image information indicating the document, a copying function for copying images recorded on a document onto sheets of paper, a facsimile function for communicating various pieces of data through a telephone line, which is not illustrated, a transfer function for transferring document information, such as image information, read by the reading function or the like, and an accumulation function for accumulating read document information, such as image information.

The image forming apparatus 20 according to the present exemplary embodiment includes a document reading unit 30 as an example of an image reader, and an image forming unit 40 is provided below the document reading unit 30. The document reading unit 30 includes a document conveying unit (not illustrated) in a document cover 32. The document conveying unit sequentially draws a document 150 set on a document feeding unit 32A provided for the document cover 32 and feeds the document 150 onto a platen glass (not illustrated). The document reading unit 30 reads images recorded on the fed document 150. The document conveying unit then discharges the document 150 from which the images have been read onto a document discharge unit 32B provided for the document cover 32. The document reading unit 30 generates image information regarding a CIELAB color space from the read images recorded on the document 150.

The document reading unit 30 is provided with a user interface 34 that receives various operations from a user. The user interface 34 includes a display 34A on which display buttons for receiving operations using a software program and various pieces of information are displayed and hardware keys 34B such as a numeric keypad. The display 34A is a touch panel where a display device such as a liquid crystal panel and a position input device such as a touchpad are combined together. The user interface 34, which includes the display buttons on the display 34A and the hardware keys 34B, is used to set the number of copies and magnification for the copying function and dial a phone number for the facsimile function. The hardware keys 34B may be omitted.

The image forming unit 40 includes sheet storage units 42 storing sheets of paper that serve as a recording medium for forming images. The image forming unit 40 takes out the sheets stored in the sheet storage units 42 one by one and forms images based on image data on the sheets through, for example, electrophotography. The image forming unit 40 then discharges, to a discharge unit, which is not illustrated, the sheets on which the images have been formed.

Figure 2:
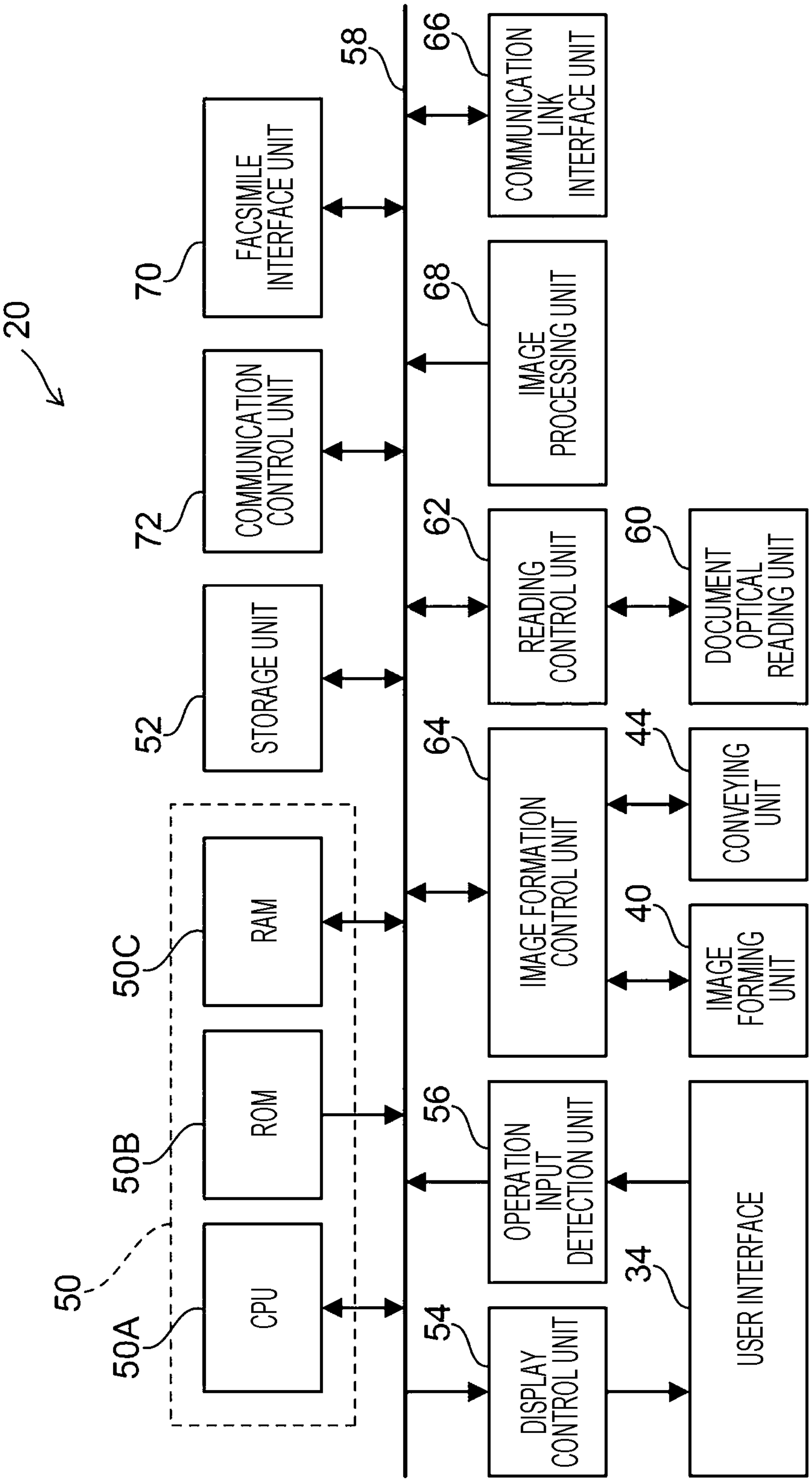
FIG. 2 is a block diagram illustrating the configuration of an electrical system of the image forming apparatus, which is an example of the image forming system according to the exemplary embodiment.

FIG. 2 is a block diagram illustrating the configuration of an electrical system of the image forming apparatus 20 according to the present exemplary embodiment.

As illustrated in FIG. 2, the image forming apparatus 20 according to the present exemplary embodiment includes a control unit 50 including a central processing unit (CPU) 50A, a read-only memory (ROM) 50B, and a random-access memory (RAM) 50C. The CPU 50A controls operation of the entirety of the image forming apparatus 20. The RAM 50C is used, for example, as a work area when the CPU 50A executes various programs. The ROM 50B stores in advance various control programs such as a program for processing an image, various parameters, and the like. In the image forming apparatus 20, the components of the control unit 50 are electrically connected to one another through a system bus 58.

The image forming apparatus 20 according to the present exemplary embodiment also includes a storage unit 52 storing various pieces of data, application programs, and the like. The image forming apparatus 20 includes a display control unit 54 that is connected to the user interface 34 and that controls display of various operation screens and the like on the display 34A of the user interface 34. The image forming apparatus 20 also includes an operation input detection unit 56 that is connected to the user interface 34 and that detects operations input through the user interface 34. In the image forming apparatus 20, the storage unit 52, the display control unit 54, and the operation input detection unit 56 are electrically connected to the system bus 58. The storage unit 52 may be, for example, a hard disk drive (HDD) or a nonvolatile storage unit such as a flash memory.

The image forming apparatus 20 according to the present exemplary embodiment also includes a reading control unit 62 that controls an operation for optically reading an image performed by a document optical reading unit 60 and an operation for feeding a document performed by the document conveying unit and an image formation control unit 64 that controls a process for forming an image performed by the image forming unit 40 and conveyance of sheets to the image forming unit 40 performed by a conveying unit 44. The image forming apparatus 20 also includes a communication link interface unit 66 that is connected to the communication link, which is not illustrated, and that communicates communication data with external apparatuses connected to the communication link, such as servers, and an image processing unit 68 that performs various types of image processing. The image forming apparatus 20 also includes a facsimile interface unit 70 that is connected to the telephone line, which is not illustrated, and that communicates facsimile data with facsimile apparatuses connected to the telephone line. The image forming apparatus 20 also includes a communication control unit 72 that controls communication of facsimile data through the facsimile interface unit 70. In the image forming apparatus 20, the communication control unit 72, the reading control unit 62, the image formation control unit 64, the communication link interface unit 66, the facsimile interface unit 70, and the image processing unit 68 are electrically connected to the system bus 58.

With the above configuration, the image forming apparatus 20 according to the present exemplary embodiment accesses the RAM 50C, the ROM 50B, and the storage unit 52 using the CPU 50A. The image forming apparatus 20 also controls, using the CPU 50A, display of information such as operation screens and various messages on the display 34A of the user interface 34 through the display control unit 54. The image forming apparatus 20 also controls operation of the document optical reading unit 60 and the document conveying unit through the reading control unit 62. The image forming apparatus 20 also controls, using the CPU 50A, operation of the image forming unit 40 and the conveying unit 44 through the image formation control unit 64 and the communication of communication data through the communication link interface unit 66. The image forming apparatus 20 controls, using the CPU 50A, the communication of facsimile data performed by the communication control unit 72 through the facsimile interface unit 70. The image forming apparatus 20 also detects, using the CPU 50A, operations performed on the user interface 34 on the basis of operation information detected by the operation input detection unit 56 and performs various types of control based on the operations.

Figure 3:
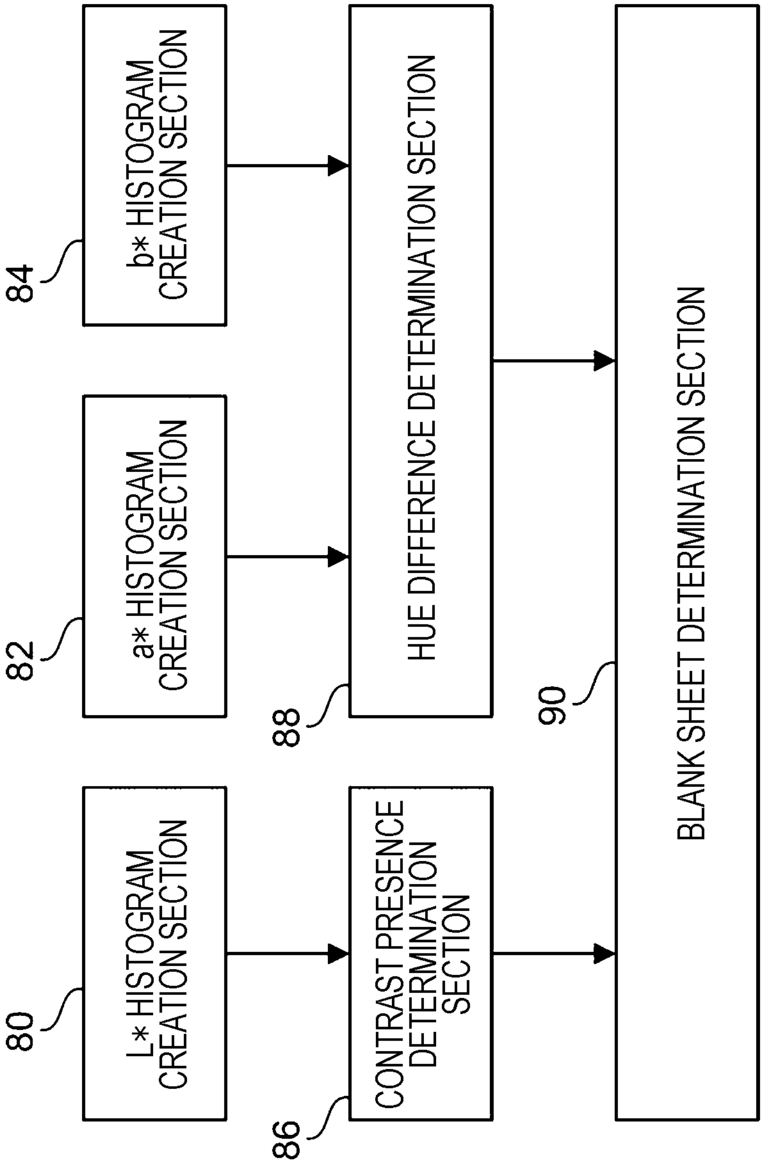
FIG. 3 is a functional block diagram illustrating an example of the functional configuration of a control unit of the image forming apparatus, which is an example of the image forming system according to the exemplary embodiment.

Next, a functional configuration that the CPU 50A of the control unit 50 achieves in the image forming apparatus 20 according to the present exemplary embodiment by loading a program stored in the ROM 50B into the RAM 50C and executing the program. FIG. 3 is a functional block diagram illustrating an example of the functional configuration of the control unit 50 of the image forming apparatus 20 according to the present exemplary embodiment.

The control unit 50 has functions of an L* histogram creation section 80, an a* histogram creation section 82, a b* histogram creation section 84, a contrast presence determination section 86, a hue difference determination section 88, and a blank sheet determination section 90. Although the functional configuration illustrated in FIG. 3 will be described as the functions of the control unit 50 in the present exemplary embodiment, the functional configuration illustrated in FIG. 3 may be, for example, that of the image processing unit 68, instead.

Figure 4A:
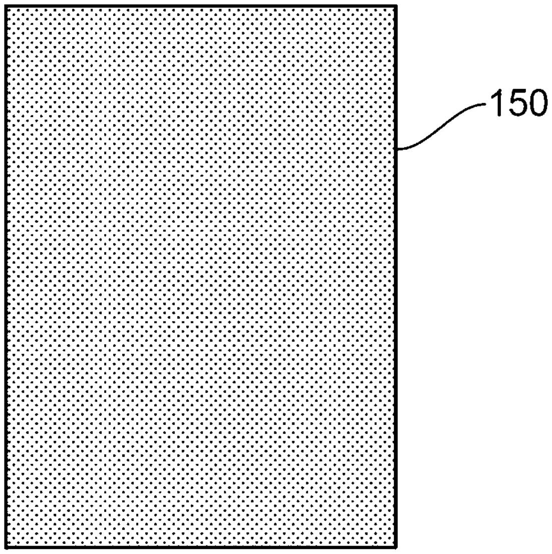
FIG. 4A is a diagram illustrating an example of a document to be read.
Figure 4B:
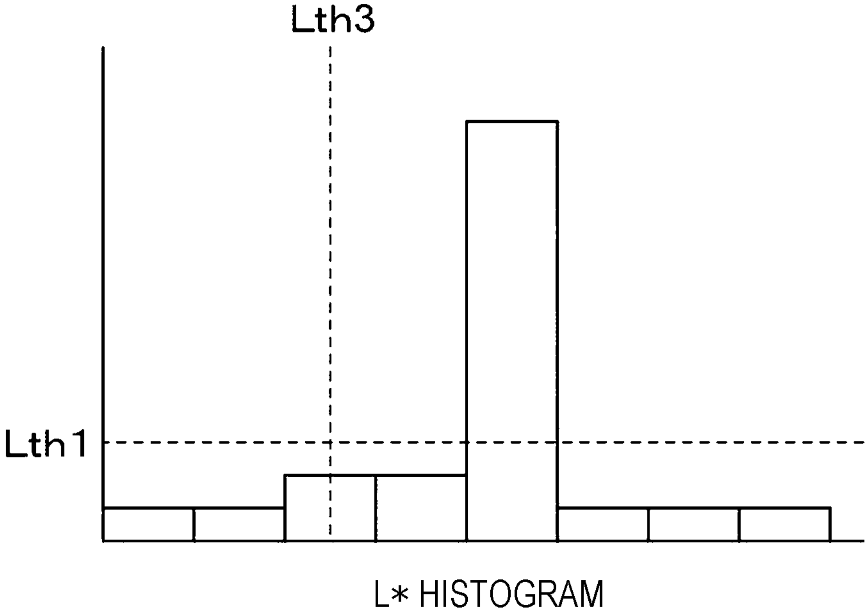
FIG. 4B is an L* histogram obtained from image information regarding a CIELAB color space obtained by reading the document illustrated in FIG. 4A.

The L* histogram creation section 80 obtains an L* histogram for image information regarding a CIELAB color space obtained by reading a document image using the document optical reading unit 60. For example, the L* histogram creation section 80 creates an L* histogram illustrated in FIG. 4B from image information regarding a CIELAB color space obtained by reading the document 150 illustrated in FIG. 4A. A threshold Lth1 illustrated in FIG. 4B is an example of a first frequency threshold in the present disclosure.

The L* histogram created by the L* histogram creation section 80 is a histogram where a frequency is the number of pixels in each of predetermined intervals (bins) for L* in the image information regarding the CIELAB color space.

Figure 4C:
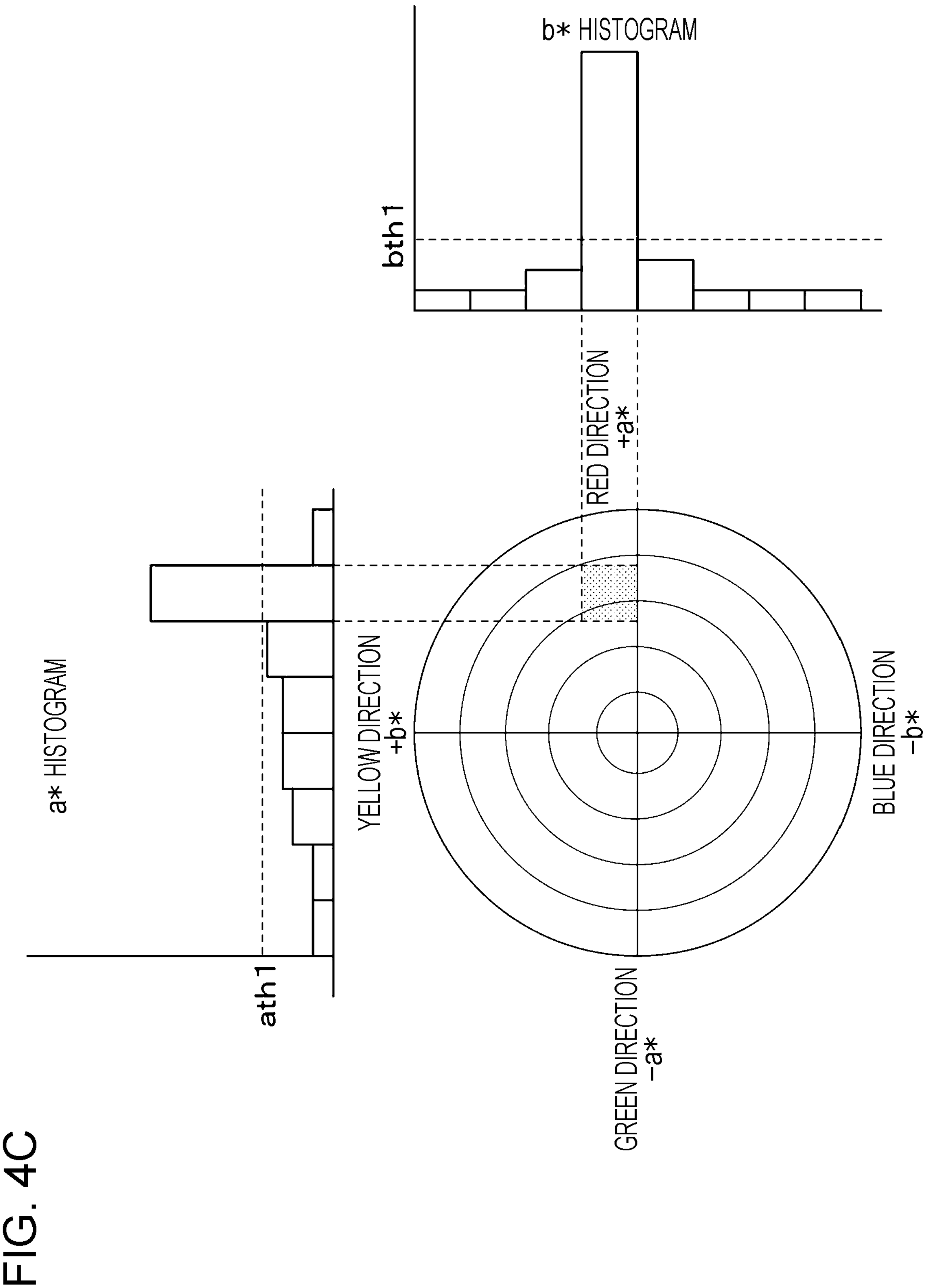
FIG. 4C is a* and b* histograms obtained from the image information regarding the CIELAB color space of the read document.

The a* histogram creation section 82 obtains an a* histogram for image information regarding a CIELAB color space. For example, the a* histogram creation section 82 creates an a* histogram illustrated in FIG. 4C from the image information regarding the CIELAB color space obtained by reading the document 150 illustrated in FIG. 4A. A threshold ath1 illustrated in FIG. 4C is an example of a second frequency threshold in the present disclosure.

The a* histogram created by the a* histogram creation section 82 is a histogram where the frequency is the number of pixels in each of predetermined intervals (bins) for a* in the image information regarding the CIELAB color space.

The b* histogram creation section 84 obtains a b* histogram for image information regarding a CIELAB color space. For example, the b* histogram creation section 84 creates a b* histogram illustrated in FIG. 4C from the image information regarding the CIELAB color space obtained by reading the document 150 illustrated in FIG. 4A. A threshold bth1 illustrated in FIG. 4C is an example of a third frequency threshold in the present disclosure.

The b* histogram created by the b* histogram creation section 84 is a histogram where the frequency is the number of pixels in each of intervals (bins) for b* in the image information regarding the CIELAB color space.

The intervals in the L*, a*, and b* histograms are optimally set in advance through an experiment or the like. In the L*, a*, and b* histograms, the number of intervals may be different from each other. The number of intervals in the a* and b* histograms, however, needs to be the same.

The contrast presence determination section 86 determines presence or absence of a contrast in the image information regarding the CIELAB color space using the L* histogram. More specifically, if the L* histogram includes two or more peaks that exceed the predetermined threshold Lth1, the contrast presence determination section 86 determines that there is a contrast. In other words, if there is one peak that exceeds the threshold Lth1 in the L* histogram, the contrast presence determination section 86 determines that there is no contrast. Even if the frequency of a bin adjacent to a bin including a peak exceeding the threshold Lth1 exceeds the threshold Lth1, the number of peaks is counted as one.

The hue difference determination section 88 determines presence or absence of a hue difference in the image information regarding the CIELAB color space using the a* and b* histograms. More specifically, if the a* histogram includes two or more peaks that exceed the predetermined threshold ath1 and/or the b* histogram includes two or more peaks that exceed the predetermined threshold bth1, the hue difference determination section 88 determines that there is a hue difference in the image information regarding the CIELAB color space. In other words, if there is one peak that exceeds the threshold ath1 in the a* histogram or there is one peak that exceeds the threshold bth1 in the b* histogram, the hue difference determination section 88 determines that there is no hue difference. Even if the frequency of a bin adjacent to a bin including a peak that exceeds the threshold ath1 exceeds the threshold ath1, the number of peaks is counted as one. Similarly, even if the frequency of a bin adjacent to a bin including a peak that exceeds the threshold bth1 exceeds the threshold bth1, the number of peaks is counted as one.

The blank sheet determination section 90 has a function of determining whether the document 150 is a blank sheet or a non-blank sheet. More specifically, if the contrast presence determination section 86 determines that there is a contrast and/or the hue difference determination section 88 determines that there is a hue difference, the blank sheet determination section 90 determines that a document image indicates a non-blank sheet.

If the contrast presence determination section 86 determines that there is no contrast and the hue difference determination section 88 determines that there is no hue difference, on the other hand, the blank sheet determination section 90 determines that a document image indicates a plain sheet (blank sheet). More specifically, if the number of peaks that exceed the threshold Lth1 in the L* histogram, the number of peaks that exceed the threshold ath1 in the a* histogram, and the number of peaks that exceed the threshold bth in the b* histogram are all one, the blank sheet determination section 90 determines that a document image indicates a blank sheet.

If the blank sheet determination section 90 determines that the document image indicates a blank sheet but L* of a bin including a peak is smaller than or equal to the predetermined threshold Lth1, the blank sheet determination section 90 determines that the document image indicates a non-blank sheet. If the blank sheet determination section 90 determines that the document image indicates a blank sheet and L* of a bin including a peak exceeds a predetermined threshold Lth3, on the other hand, the blank sheet determination section 90 determines that the document image indicates a white blank sheet.

Figure 5A:
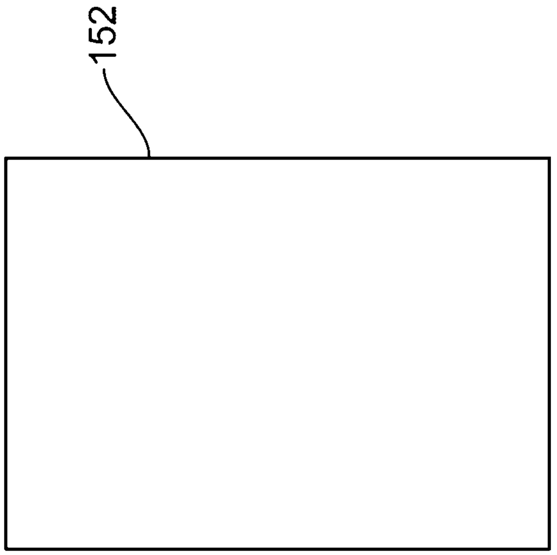
FIG. 5A is a diagram illustrating another example of the document to be read.
Figure 5B:
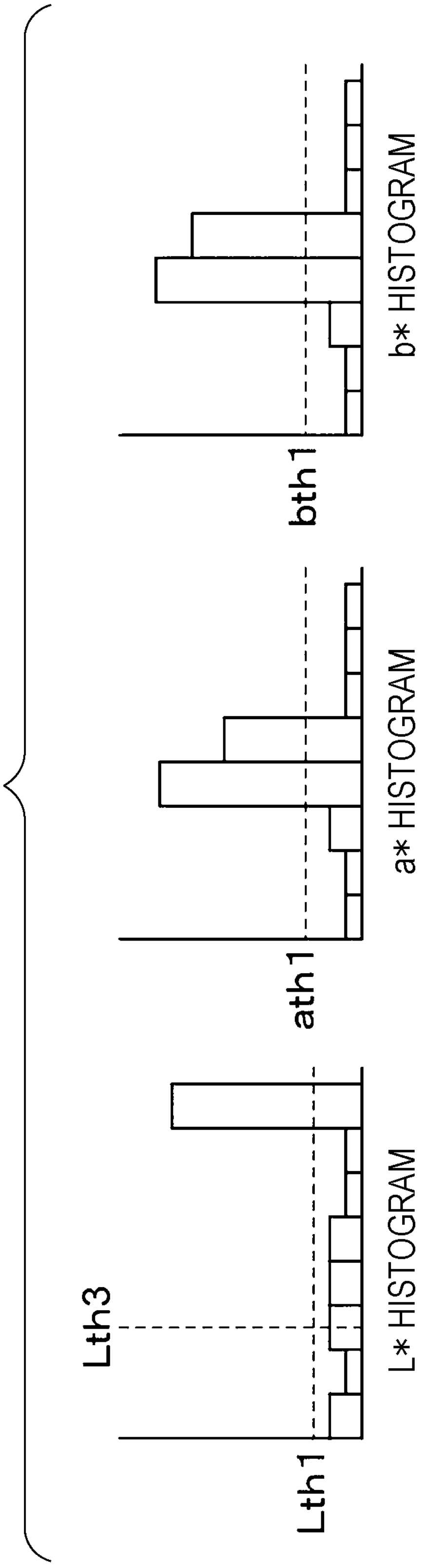
FIG. 5B is L*, a*, and b* histograms obtained from image information regarding a CIELAB color space obtained by reading the document illustrated in FIG. 5A.

When a document 152 is a white blank sheet as illustrated in FIG. 5A, for example, the number of peaks that exceed the threshold Lth1 in the L* histogram is one as illustrated in FIG. 5B. Since the document 152 is white, L* of a bin including the peak shows a maximum value. The "maximum value shown by L* of a bin" herein refers to a maximum value within a range of L* included in the bin. Because L* for white is 255 in the present exemplary embodiment, for example, the maximum value of L* of the bin including the peak in the L* histogram is 255.

In addition, as illustrated in FIG. 5B, the number of peaks that exceed the threshold ath1 in the a* histogram and the number of peaks that exceed the threshold bth1 in the b* histogram are both one. The frequency is higher around centers (i.e., gray axes) of the a* and b* histograms.

Since the number of peaks that exceed the threshold Lth1 in the L* histogram, the number of peaks that exceed the threshold ath1 in the a* histogram, and the number of peaks that exceed the threshold bth1 in the b* histogram are all one as illustrated in FIG. 5B, the control unit 50 determines that the document 152 is a blank sheet (plain sheet). A white blank document may also be referred to as a white plain document.

Figure 6A:
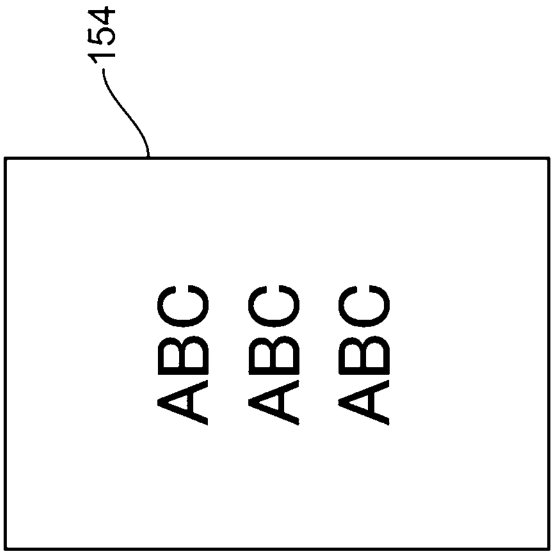
FIG. 6A is a diagram illustrating another example of the document to be read.
Figure 6B:
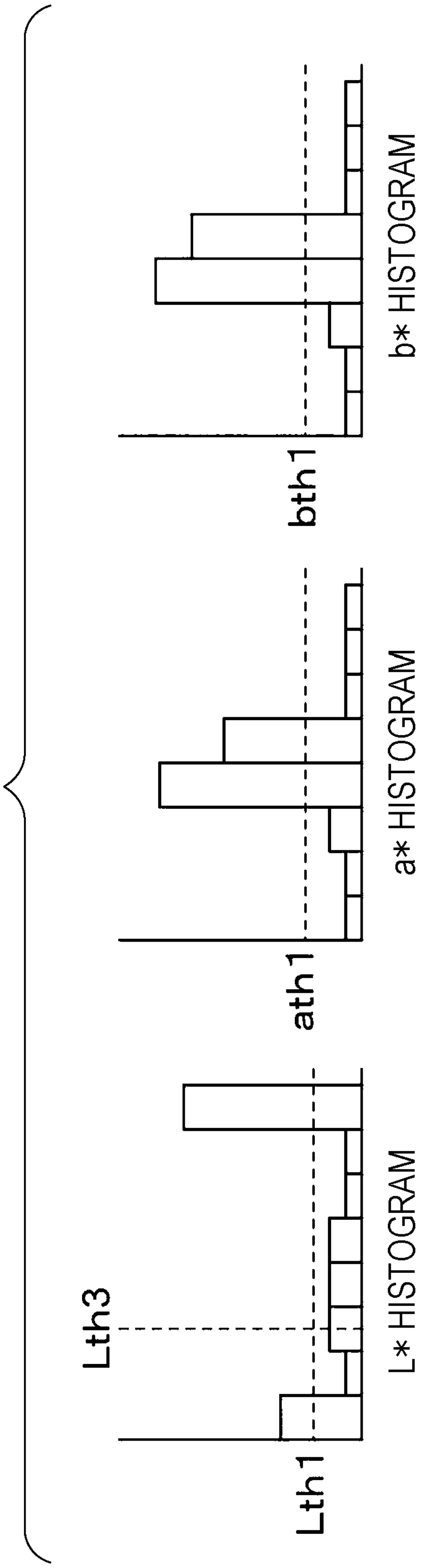
FIG. 6B is L*, a*, and b* histograms obtained from image information regarding a CIELAB color space obtained by reading the document illustrated in FIG. 6A.

When a document 154 is a white sheet with black letters thereon as illustrated in FIG. 6A, for example, the number of peaks that exceed the threshold Lth1 in the L* histogram is two as illustrated in FIG. 6B. Since the document 154 is a white sheet with black letters thereon, L* of a bin including a first peak shows a minimum value, and L* of a bin including a second peak shows a maximum value. The "minimum value shown by L* of a bin" herein refers to a minimum value within the range of L* included in the bin. Because L* for black is 0 in the present exemplary embodiment, for example, the minimum value of L* of the bin including the first peak in the L* histogram is 0.

In addition, as illustrated in FIG. 6B, the number of peaks that exceed the threshold ath1 in the a* histogram and the number of peaks that exceed the threshold bth1 in the b* histogram are both one. The frequency is higher around the centers (i.e., gray axes) of the a* and b* histograms.

Since the L* histogram includes two peaks that exceed the threshold Lth1 as illustrated in FIG. 6B, the blank sheet determination section 90 of the control unit 50 determines that the document 154 is a non-blank sheet.

Figure 7A:
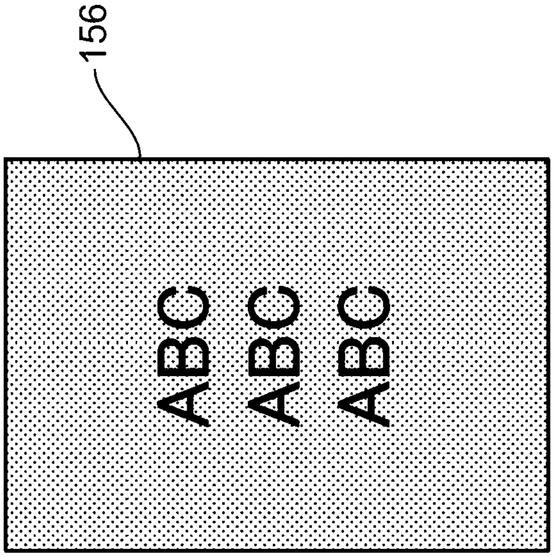
FIG. 7A is a diagram illustrating another example of the document to be read.
Figure 7B:
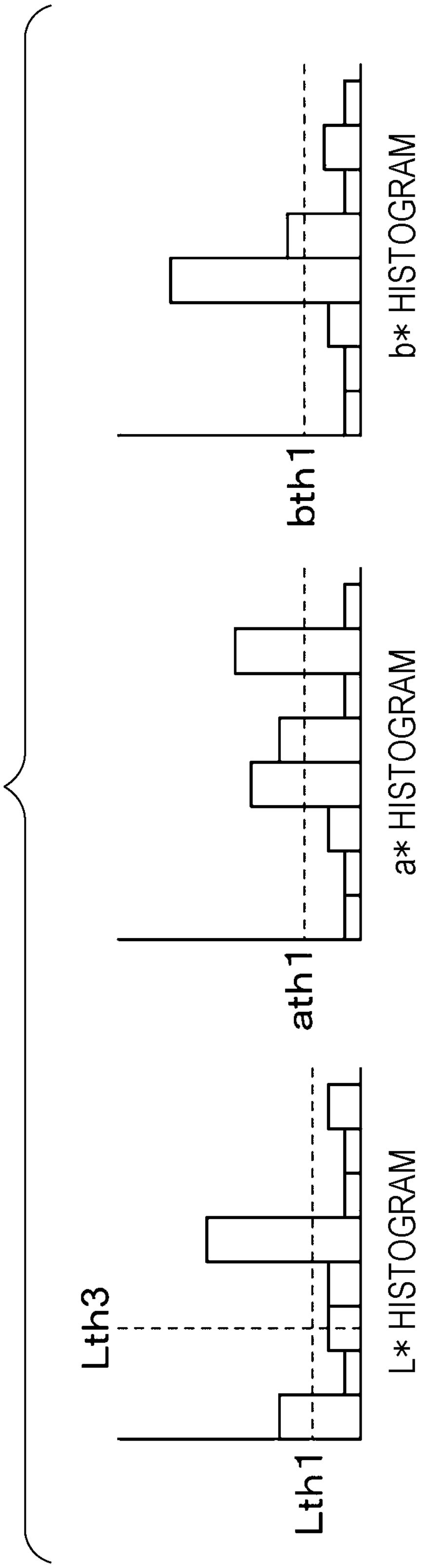
FIG. 7B is L*, a*, and b* histograms obtained from image information regarding a CIELAB color space obtained by reading the document illustrated in FIG. 7A.

When a document 156 is a pink sheet with black letters thereon as illustrated in FIG. 7A, for example, the number of peaks that exceed the threshold Lth1 in the L* histogram is two as illustrated in FIG. 7B.

In addition, as illustrated in FIG. 7B, the number of peaks that exceed the threshold ath1 in the a* histogram is two, and the number of peaks that exceed the threshold bth1 in the b* histogram is one.

Since the L* histogram includes two peaks that exceed the threshold Lth1 and the a* histogram includes two peaks that exceed the threshold ath1 as illustrated in FIG. 7B, the blank sheet determination section 90 of the control unit 50 determines that the document 156 is a non-blank sheet.

Figure 8A:
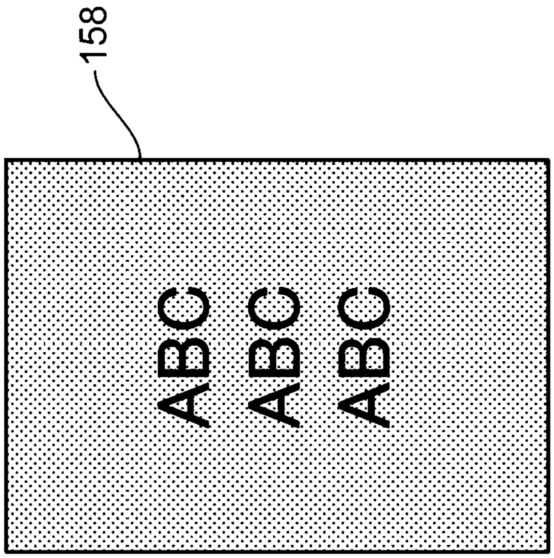
FIG. 8A is a diagram illustrating another example of the document to be read.
Figure 8B:
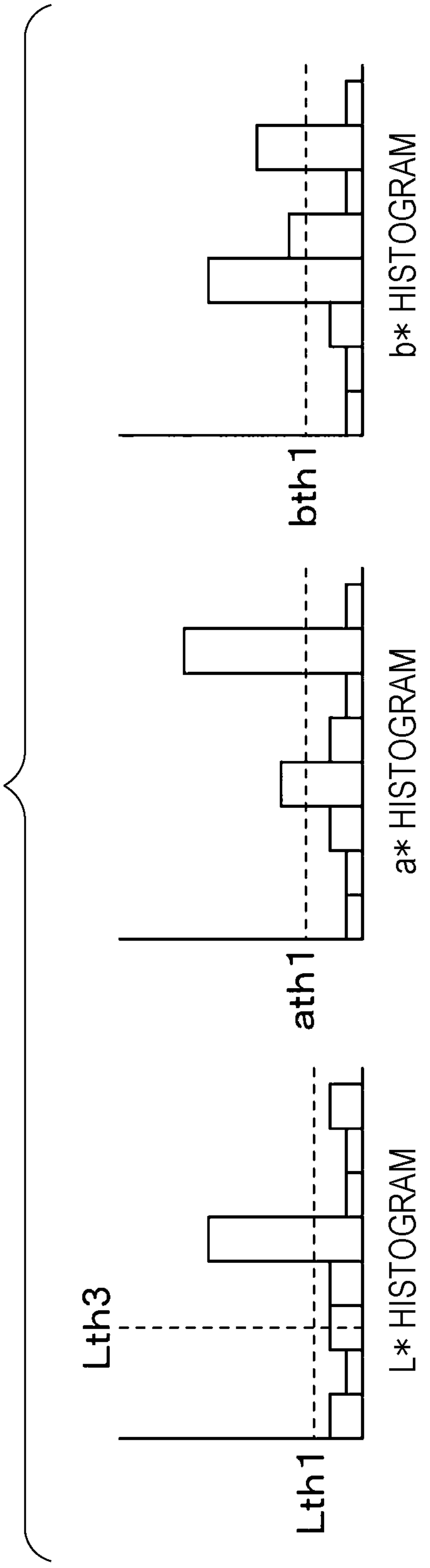
FIG. 8B is L*, a*, and b* histograms obtained from image information regarding a CIELAB color space obtained by reading the document illustrated in FIG. 8A.

When a document 158 is a pink sheet with light blue letters thereon (i.e., when similar luminance values are observed in the case of a colored sheet and colored letters) as illustrated in FIG. 8A, for example, the number of peaks that exceed the threshold Lth1 in the L* histogram is one as illustrated in FIG. 8B.

In addition, as illustrated in FIG. 8B, the number of peaks that exceed the threshold ath1 in the a* histogram and the number of peaks that exceed the threshold bth1 in the b* histogram are both two.

Since the a* histogram includes two peaks that exceed the threshold ath1 and the b* histogram includes two peaks that exceed the threshold bth1 as illustrated in FIG. 8B, the blank sheet determination section 90 of the control unit 50 determines that the document 158 is a non-blank sheet.

Figure 9A:
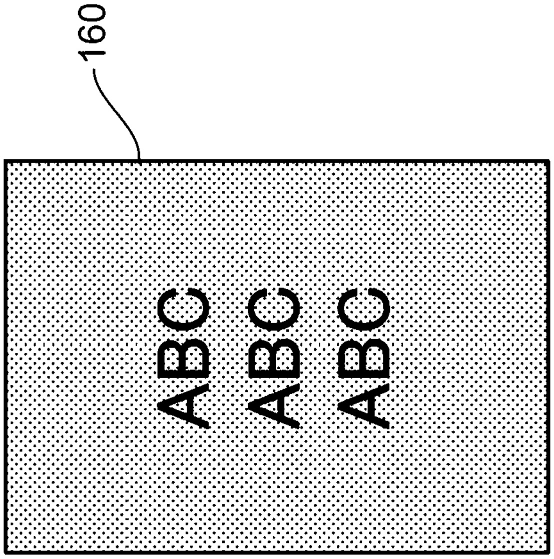
FIG. 9A is a diagram illustrating another example of the document to be read.
Figure 9B:
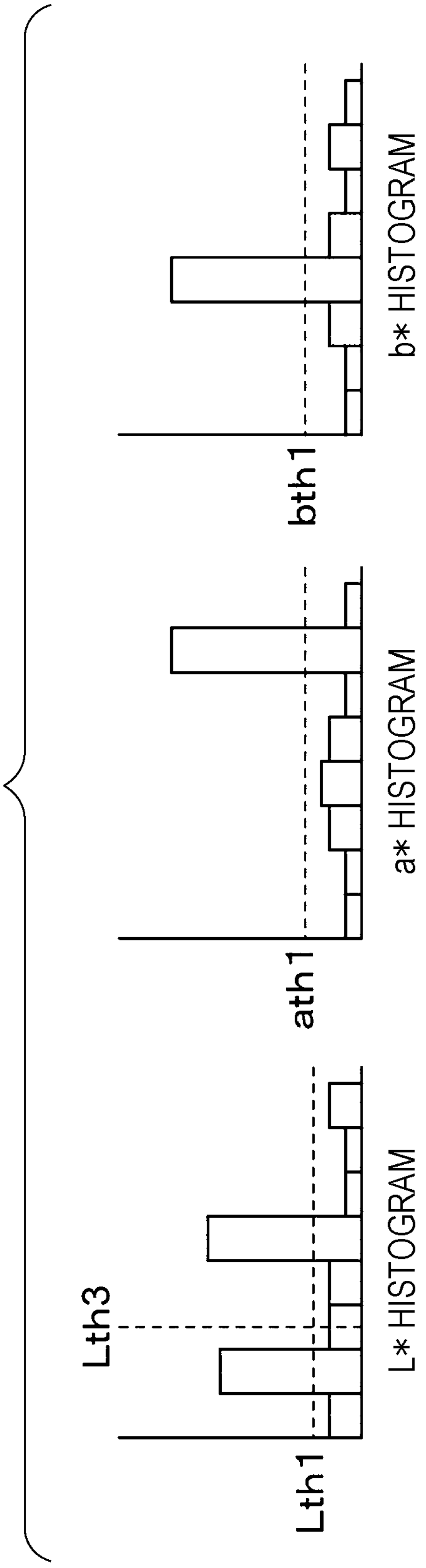
FIG. 9B is L*, a*, and b* histograms obtained from image information regarding a CIELAB color space obtained by reading the document illustrated in FIG. 9A.

When a document 160 is a pink sheet with red letters thereon (i.e., when similar hues are observed in the case of a colored sheet and colored letters) as illustrated in FIG. 9A, for example, the number of peaks that exceed the threshold Lth1 in the L* histogram is two as illustrated in FIG. 9B.

In addition, as illustrated in FIG. 9B, the number of peaks that exceed the threshold ath1 in the a* histogram and the number of peaks that exceed the threshold bth1 in the b* histogram are both one.

Since the L* histogram includes two peaks that exceed the threshold Lth1 as illustrated in FIG. 9B, the blank sheet determination section 90 of the control unit 50 determines that the document 160 is a non-blank sheet.

Figure 10A:
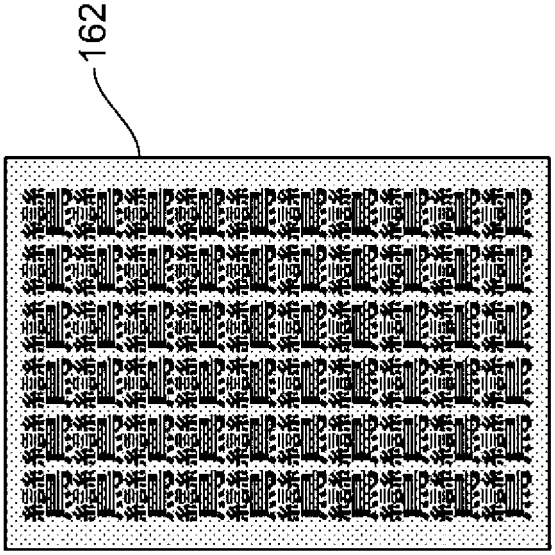
FIG. 10A is a diagram illustrating another example of the document to be read.
Figure 10B:
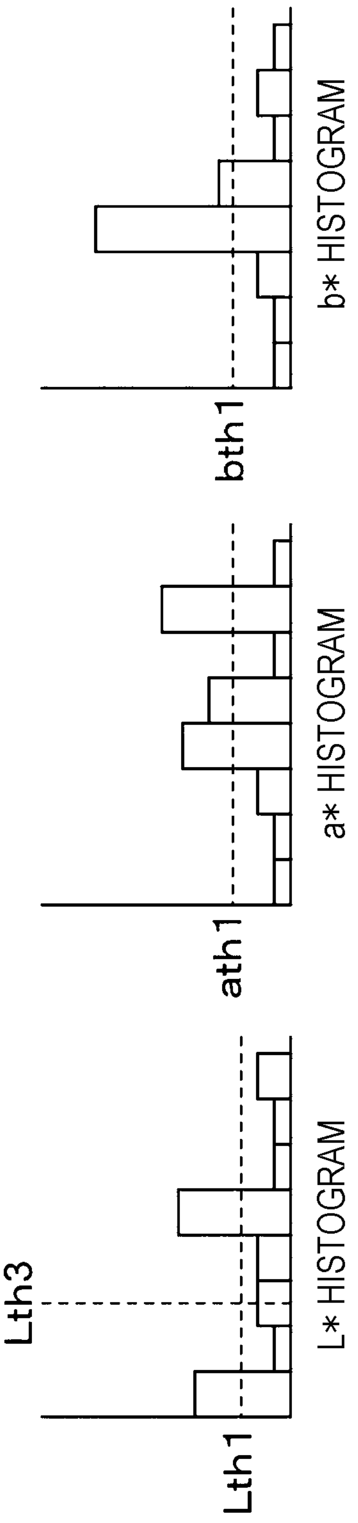
FIG. 10B is L*, a*, and b* histograms obtained from image information regarding a CIELAB color space obtained by reading the document illustrated in FIG. 10A.

When a document 162 is a pink sheet with black letters thereon (when letters occupy an area larger than that of a background color) as illustrated in FIG. 10A, for example, the number of peaks that exceed the threshold Lth1 in the L* histogram is two as illustrated in FIG. 10B.

In addition, as illustrated in FIG. 10B, the number of peaks that exceed the threshold ath1 in the a* histogram is two, and the number of peaks that exceed the threshold bth1 in the b* histogram is one.

Since the L* histogram includes two peaks that exceed the threshold Lth1 and the a* histogram includes two peaks that exceed the threshold ath1 as illustrated in FIG. 10B, the blank sheet determination section 90 of the control unit 50 determines that the document 162 is a non-blank sheet.

Figure 11:
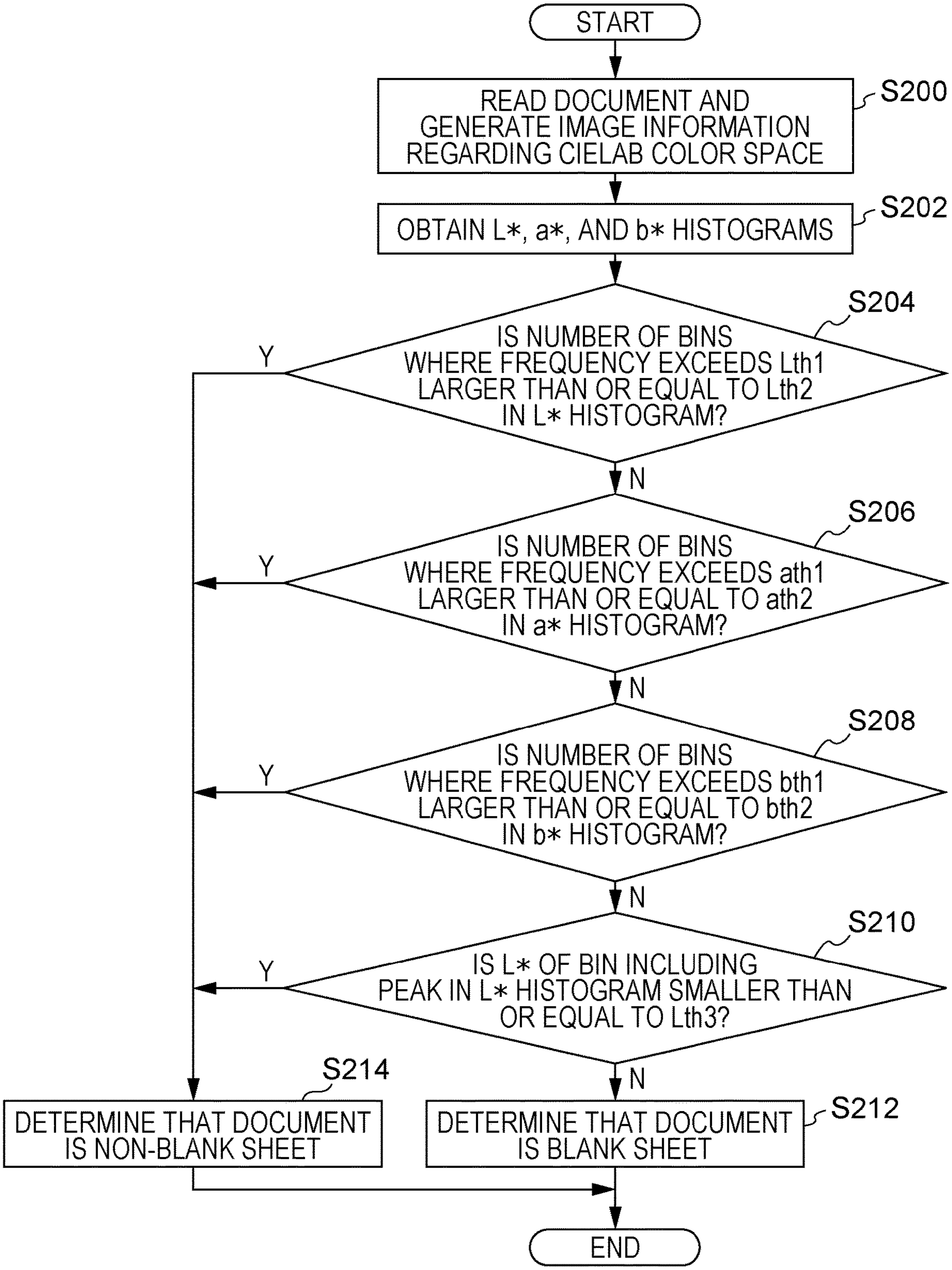
FIG. 11 is a flowchart illustrating an example of a process performed by a control unit of the image forming apparatus according to the exemplary embodiment.

Next, a specific process performed by the image forming apparatus 20 according to the present exemplary embodiment configured as described above will be described. FIG. 11 is a flowchart illustrating an example of a process performed by the control unit 50 of the image forming apparatus 20 according to the present exemplary embodiment. The process illustrated in FIG. 11 starts when, for example, the user inputs a predetermined command for image information using the user interface 34. The image information may be image information obtained by reading a document using the document optical reading unit 60 or image information obtained by reading a document using the document optical reading unit 60 and saved to the storage unit 52 in advance.

In step S200, the CPU 50A generates image information regarding a CIELAB color space of the document 150 read by the document optical reading unit 60 and proceeds to step S202.

In step S202, the CPU 50A obtains L*, a*, and b* histograms. That is, the CPU 50A creates the L* histogram, the a* histogram, and the b* histogram and proceeds to step S204.

In step S204, the CPU 50A determines whether the number of bins where the frequency exceeds the threshold Lth1 is larger than or equal to a threshold Lth2 in the L* histogram. In the present exemplary embodiment, the threshold Lth2 is 2. That is, the CPU 50A determines whether there are two or more bins where the frequency exceeds the threshold Lth1. If the L* histogram includes two or more bins where the frequency exceeds the threshold Lth1, the CPU 50A proceeds to step S214, and if the number of such bins is one, the CPU 50A proceeds to step S206.

In step S206, the CPU 50A determines whether the number of bins where the frequency exceeds the threshold ath1 is larger than or equal to a threshold ath2 in the a* histogram. In the present exemplary embodiment, the threshold ath2 is 2. That is, the CPU 50A determines whether there are two or more bins where the frequency exceeds the threshold ath1. If the a* histogram includes two or more bins where the frequency exceeds the threshold ath1, the CPU 50A proceeds to step S214, and if the number of such bins is one, the CPU 50A proceeds to step S208.

In step S208, the CPU 50A determines whether the number of bins where the frequency exceeds the threshold bth1 is larger than or equal to a threshold bth2 in the b* histogram. In the present exemplary embodiment, the threshold bth2 is 2. That is, the CPU 50A determines whether there are two or more bins where the frequency exceeds the threshold bth1. If the b* histogram includes two or more bins where the frequency exceeds the threshold bth1, the CPU 50A proceeds to step S214, and if the number of such bins is one, the CPU 50A proceeds to step S210.

In step S210, the CPU 50A determines whether L* of the bin where the frequency exceeds the threshold Lth1 (i.e., the bin including a peak) in the L* histogram is smaller than or equal to the threshold Lth3. If L* of the bin including a peak is smaller than or equal to the threshold Lth3 in the L* histogram, the CPU 50A proceeds to step S214, and if L* of the bin including a peak exceeds the threshold Lth3, the CPU 50A proceeds to step S212.

In step S212, the CPU 50A determines that the document 150 is a blank sheet (white blank sheet) and ends the process.

In step S214, the CPU 50A determines that the document 150 is a non-blank sheet and ends the process.

Figure 12:
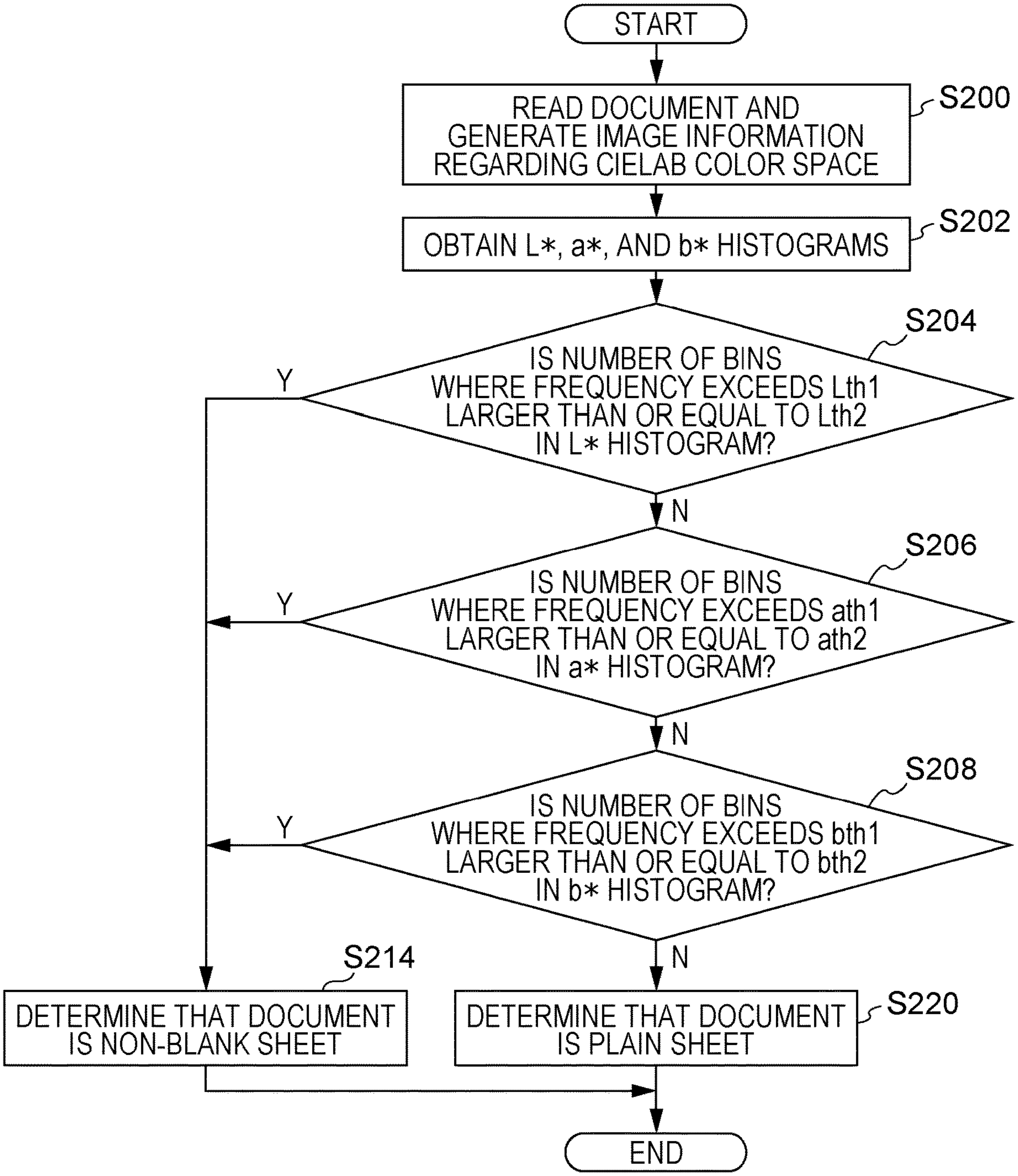
FIG. 12 is a flowchart illustrating a first modification of the process performed by the control unit of the image forming apparatus according to the present exemplary embodiment.
Figure 13:
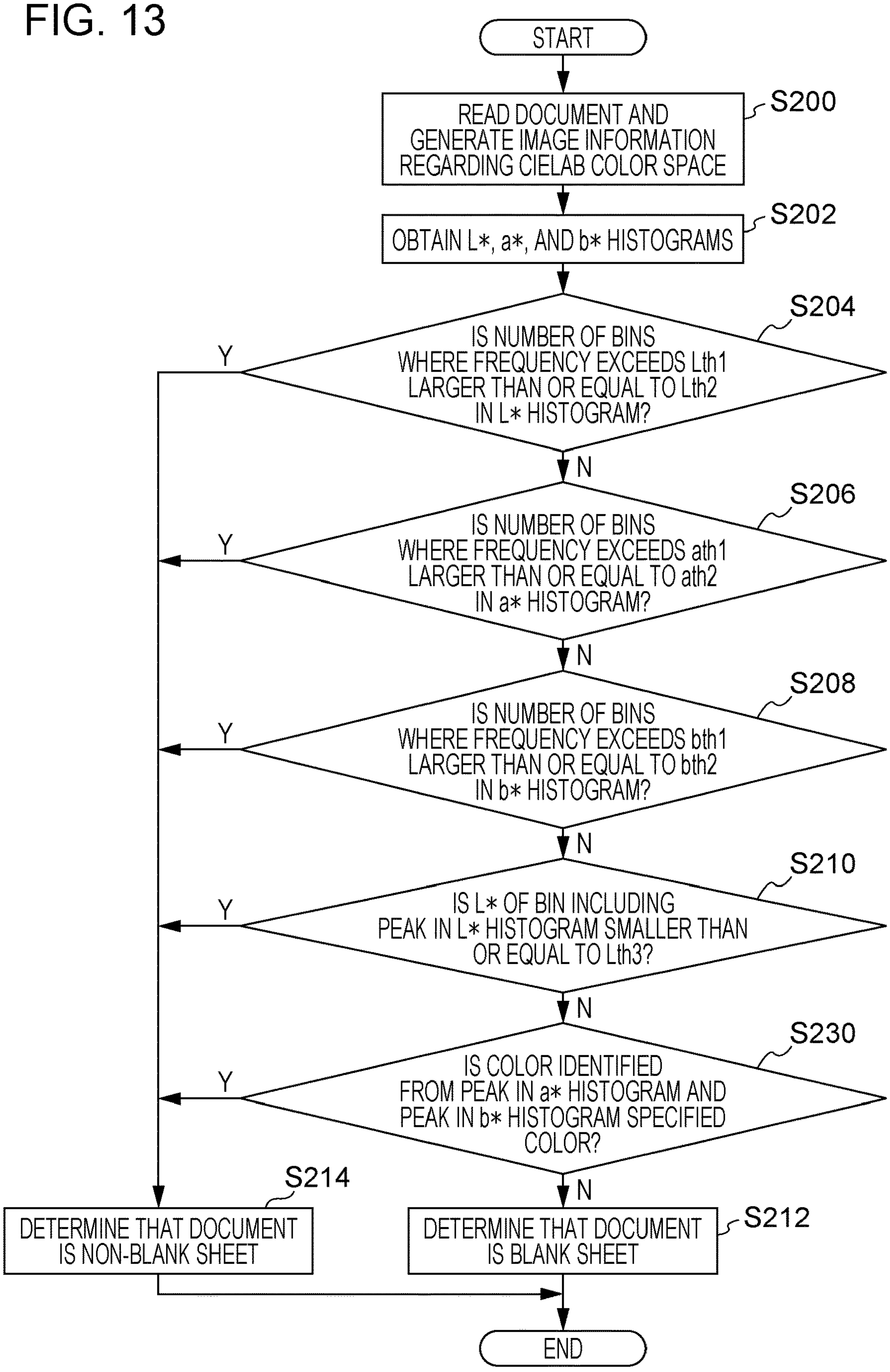
FIG. 13 is a flowchart illustrating a second modification of the process performed by the control unit of the image forming apparatus according to the present exemplary embodiment.

Next, modifications of the process performed by the control unit 50 of the image forming apparatus 20 according to the present exemplary embodiment will be described. FIGS. 12 and 13 are flowcharts illustrating the modifications of the process performed by the control unit 50 of the image forming apparatus 20 according to the present exemplary embodiment. The same steps as in FIG. 11 are given the same reference numerals, and detailed description thereof is omitted.

In a first modification, step S220 replaces steps S210 and S212 in the process illustrated in FIG. 11. That is, if determining in step S208 that the number of bins where the frequency exceeds the threshold bth1 in the b* histogram is one, the CPU 50A proceeds to step S220. In step S220, the CPU 50A determines that the document 150 is a blank sheet (plain sheet) and ends the process. The CPU 50A may just determine that the document 150 is a plain sheet.

In a second modification, step S230 is added to the process illustrated in FIG. 11. That is, if determining in step S210 that L* of the bin including a peak in the L* histogram exceeds the threshold Lth3, the CPU 50A proceeds to step S230. In step S230, the CPU 50A determines whether a color identified from a peak in the a* histogram and a peak in the b* histogram is a specified color, which is a color specified in advance. If the identified color is the specified color, the CPU 50A proceeds to step S214, and if the identified color is not the specified color, the CPU 50A proceeds to step S212. The CPU 50A may thus determine that the document 150 is a non-blank sheet on the basis of the specified color when the document 150 is a colored sheet.

In the process illustrated in FIG. 11, the following step may replace step S210. In this step, for example, the CPU 50A determines whether L* of a bin including a peak is the maximum value in the L* histogram. If determining in this step that L* of the bin including a peak is the maximum value in the L* histogram, the CPU 50A proceeds to step S212, and if determining that L* of the bin including a peak is not the maximum value, the CPU 50A proceeds to step S214. As a result, whether the document 150 is a white blank sheet can be accurately determined.

Steps S204, S206, and S208 may be switched as necessary.

Figure 14:
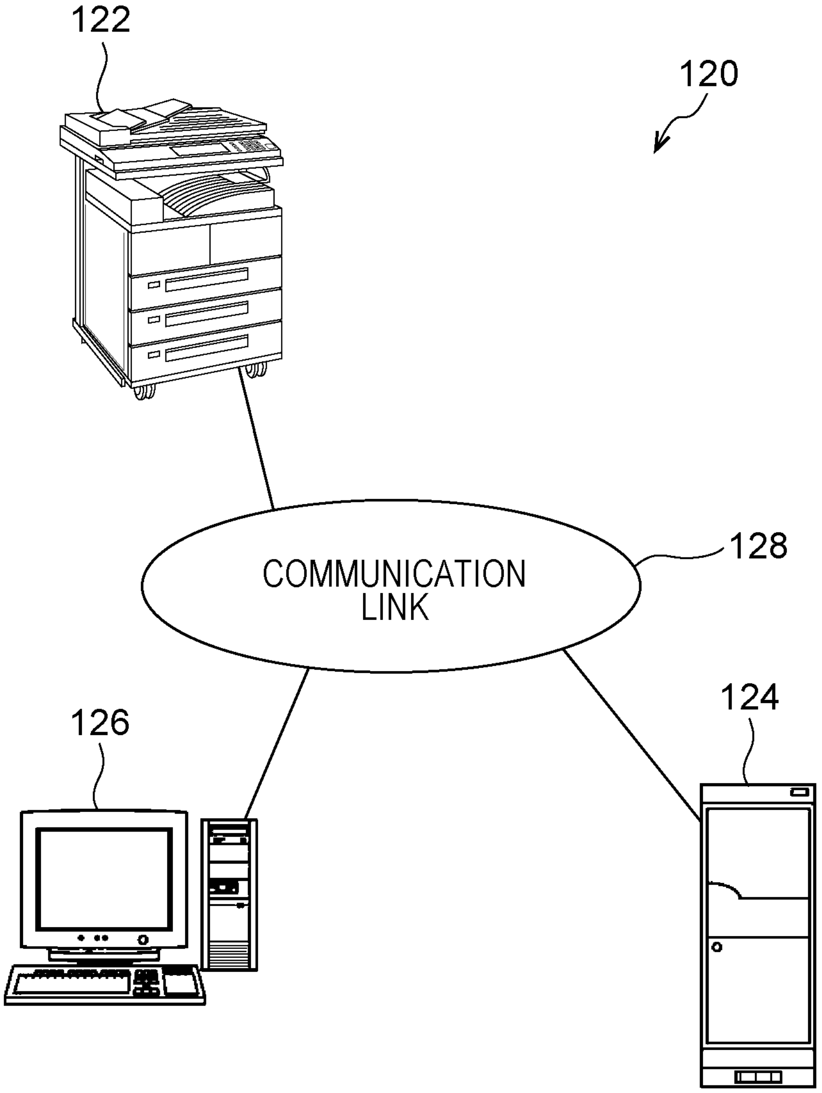
FIG. 14 is a diagram illustrating a modification of the image forming system according to the exemplary embodiment.

Although an example where the image forming apparatus 20 performs the processes illustrated in FIGS. 11, 12, and 13 has been described in the above exemplary embodiment, the processes illustrated in FIGS. 11, 12, and 13 need not be performed by the image forming apparatus 20. As illustrated in FIG. 14, for example, an image processing system 120 where an image forming apparatus 122 and at least a server 124, such as a client server, or a client computer 126 are connected to a communication link 128 may be used, instead. In this case, the server 124 or the client computer 126 may perform at least one of the processes illustrated in FIGS. 11, 12, and 13 using the image forming apparatus 122 as an image reading apparatus and the server 124 or the client computer 126 as an image processing apparatus. In the case of an image forming system including both the server 124 and the client computer 126, the server 124 and the client computer 126 may operate together to perform the processes illustrated in FIGS. 11, 12, and 13.

Figure 15:
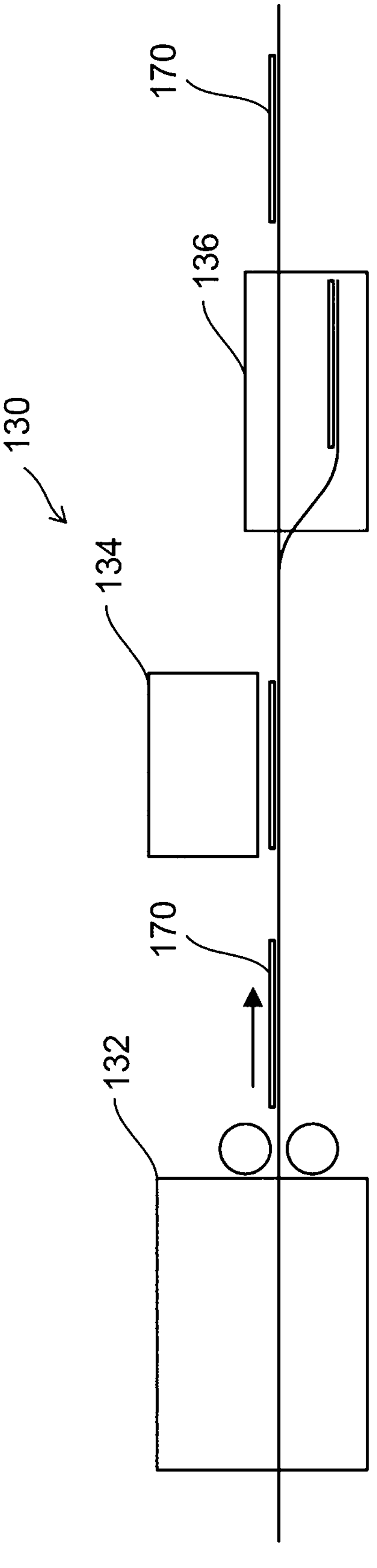
FIG. 15 is a diagram illustrating another modification of the image forming system according to the exemplary embodiment.

Although an example where the image forming apparatus 20, which is an example of the image processing system, performs the processes illustrated in FIGS. 11, 12, and 13 has been described in the above exemplary embodiment, the image forming apparatus 20 is not limited to this. As illustrated in FIG. 15, for example, an image processing system 130 may include an image forming apparatus 132, an image checking apparatus 134, and a blank sheet removal unit 136. The image forming apparatus 132 discharges downstream a document 170 on which an image has been formed. The image checking apparatus 134 reads the image on the document 170 and checks the image. More specifically, the image checking apparatus 134 determines whether the document 170 is a blank sheet. If the image checking apparatus 134 determines that the document 170 is a non-blank sheet, the blank sheet removal unit 136 removes the document 170 from a sheet conveying path. As a result, blank sheets are not conveyed downstream. A control unit in the image processing system 130 may be incorporated into the image checking apparatus 134, the image forming apparatus 132, or the blank sheet removal unit 136.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The processes performed by the image forming apparatus 20 according to the above exemplary embodiment may be achieved by software, hardware, or a combination of software and hardware. The processes performed by the image forming apparatus 20 may be stored in a storage medium as programs and distributed.

The present disclosure is not limited to the above description, and may be modified in various ways and implemented without deviating from the scope thereof.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

Appendix (((1)))

An image processing system including:

an image reader that reads a document image and that generates image information regarding a CIELAB color space; and a processor configured to:

obtain L*, a*, and b* histograms for the image information;

determine whether there is a contrast in the image information using the L* histogram;

determine whether there is a hue difference in the image information using the a* and b* histograms; and determine, if there is a contrast and/or there is a hue difference, that the document image indicates a non-blank sheet.

(((2)))

The image processing system according to (((1))), in which the L* histogram is a histogram where a frequency is a number of pixels in each of predetermined intervals for L* in the image information, and in which the processor is configured to determine, if the L* histogram includes two or more peaks that exceed a predetermined first frequency threshold, that there is a contrast.

(((3)))

The image processing system according to (((1))) or (((2))), in which the a* histogram is a histogram where a frequency is a number of pixels in each of predetermined intervals for a* in the image information, in which the b* histogram is a histogram where a frequency is a number of pixels in each of predetermined intervals for b* in the image information, and in which the processor is configured to determine, if the a* histogram includes two or more peaks that exceed a predetermined second frequency threshold and/or the b* histogram includes two or more peaks that exceed a predetermined third frequency threshold, that there is a hue difference in the image information.

(((4)))

The image processing system according to any of (((1))) to (((3))), in which the processor is configured to determine, if there is no contrast and there is no hue difference, that the document image indicates a white blank sheet.

(((5)))

The image processing system according to any of (((1))) to (((3))), in which the L* histogram is a histogram where a frequency is a number of pixels in each of predetermined intervals for L* in the image information, in which the a* histogram is a histogram where a frequency is a number of pixels in each of predetermined intervals for a* in the image information, in which the b* histogram is a histogram where a frequency is a number of pixels in each of predetermined intervals for b* in the image information, and in which the processor is configured to determine, if a number of peaks that exceed a predetermined first frequency threshold in the L* histogram, a number of peaks that exceed a predetermined second frequency threshold in the a* histogram, and a number of peaks that exceed a predetermined third frequency threshold in the b* histogram are all one, that the document image indicates a blank sheet.

(((6)))

The image processing system according to (((5))), in which the processor is configured to determine, if the processor determines that the document image indicates a blank sheet but L* of an interval including a peak is smaller than or equal to a predetermined first L* threshold in the L* histogram, that the document image indicates a non-blank sheet.

(((7)))

The image processing system according to (((6))), in which the processor is configured to determine, if L* of the interval including the peak is a maximum value in the L* histogram, that the document image indicates a blank sheet.

(((8)))

The image processing system according to (((5))) or (((6))), in which the processor is configured to determine, if the processor determines that the document image indicates a blank sheet but a color identified from a peak in the a* histogram and a peak in the b* histogram includes a specified color, which is a color specified in advance, that the document image indicates a non-blank sheet.

(((9)))

A program causing a computer to execute a process for processing an image, the process including:

reading a document image and generating image information regarding a CIELAB color space;

obtaining L*, a*, and b* histograms for the image information;

determining whether there is a contrast in the image information using the L* histogram;

determining whether there is a hue difference in the image information using the a* and b* histograms; and determine, if there is a contrast and/or there is a hue difference, that the document image indicates a non-blank sheet.

What is claimed is:

1. An image processing system comprising:

an image reader that reads a document image and that generates image information regarding a CIELAB color space; and a processor configured to:

obtain L*, a*, and b* histograms for the image information;

determine whether there is a contrast in the image information using the L* histogram;

determine whether there is a hue difference in the image information using the a* and b* histograms; and determine, if there is a contrast and/or there is a hue difference, that the document image indicates a non-blank sheet, wherein the processor is configured to determine, if the L* histogram includes two or more peaks that exceed a predetermined first frequency threshold, that there is a contrast.

2. The image processing system according to claim 1, wherein the L* histogram is a histogram where a frequency is a number of pixels in each of predetermined intervals for L* in the image information.

3. The image processing system according to claim 1, wherein the a* histogram is a histogram where a frequency is a number of pixels in each of predetermined intervals for a* in the image information, wherein the b* histogram is a histogram where a frequency is a number of pixels in each of predetermined intervals for b* in the image information, and wherein the processor is configured to determine, if the a* histogram includes two or more peaks that exceed a predetermined second frequency threshold and/or the b* histogram includes two or more peaks that exceed a predetermined third frequency threshold, that there is a hue difference in the image information.

4. The image processing system according to claim 1, wherein the processor is configured to determine, if there is no contrast and there is no hue difference, that the document image indicates a white blank sheet.

5. The image processing system according to claim 1, wherein the L* histogram is a histogram where a frequency is a number of pixels in each of predetermined intervals for L* in the image information, wherein the a* histogram is a histogram where a frequency is a number of pixels in each of predetermined intervals for a* in the image information, wherein the b* histogram is a histogram where a frequency is a number of pixels in each of predetermined intervals for b* in the image information, and wherein the processor is configured to determine, if a number of peaks that exceed the predetermined first frequency threshold in the L* histogram, a number of peaks that exceed a predetermined second frequency threshold in the a* histogram, and a number of peaks that exceed a predetermined third frequency threshold in the b* histogram are all one, that the document image indicates a blank sheet.

6. The image processing system according to claim 5, wherein the processor is configured to determine, if the processor determines that the document image indicates a blank sheet but L* of an interval including a peak is smaller than or equal to a predetermined first L* threshold in the L* histogram, that the document image indicates a non-blank sheet.

7. The image processing system according to claim 6, wherein the processor is configured to determine, if L* of the interval including the peak is a maximum value in the L* histogram, that the document image indicates a blank sheet.

8. The image processing system according to claim 5, wherein the processor is configured to determine, if the processor determines that the document image indicates a blank sheet but a color identified from a peak in the a* histogram and a peak in the b* histogram includes a specified color, which is a color specified in advance, that the document image indicates a non-blank sheet.

9. The image processing system according to claim 6, wherein the processor is configured to determine, if the processor determines that the document image indicates a blank sheet but a color identified from a peak in the a* histogram and a peak in the b* histogram includes a specified color, which is a color specified in advance, that the document image indicates a non-blank sheet.

10. A non-transitory computer readable medium storing a program causing a computer to execute a process for processing an image, the process comprising:

reading a document image and generating image information regarding a CIELAB color space;

obtaining L*, a*, and b* histograms for the image information;

determining whether there is a contrast in the image information using the L* histogram;

determining whether there is a hue difference in the image information using the a* and b* histograms;

determining, if there is a contrast and/or there is a hue difference, that the document image indicates a non-blank sheet; and determining, if the L* histogram includes two or more peaks that exceed a predetermined first frequency threshold, that there is a contrast.

11. A method for processing an image, the method comprising:

reading a document image and generating image information regarding a CIELAB color space;

obtaining L*, a*, and b* histograms for the image information;

determining whether there is a contrast in the image information using the L* histogram;

determining whether there is a hue difference in the image information using the a* and b* histograms;

determining, if there is a contrast and/or there is a hue difference, that the document image indicates a non-blank sheet; and determining, if the L* histogram includes two or more peaks that exceed a predetermined first frequency threshold, that there is a contrast.

* * * * *